(12) United States Patent
Han

(10) Patent No.: US 10,374,944 B2
(45) Date of Patent: Aug. 6, 2019

(54) QUALITY OF SERVICE FOR DATA TRANSMISSION

(71) Applicant: Futurewei Technologies, Inc., Plano, TX (US)

(72) Inventor: Lin Han, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 3 days.

(21) Appl. No.: 15/714,685

(22) Filed: Sep. 25, 2017

(65) Prior Publication Data

US 2019/0097920 A1 Mar. 28, 2019

(51) Int. Cl.
| H04L 29/06 | (2006.01) |
| H04L 12/725 | (2013.01) |
| H04L 12/741 | (2013.01) |
| H04L 12/749 | (2013.01) |
| H04L 12/801 | (2013.01) |
| H04L 12/851 | (2013.01) |

(52) U.S. Cl.
CPC .......... *H04L 45/302* (2013.01); *H04L 45/74* (2013.01); *H04L 69/22* (2013.01); *H04L 45/741* (2013.01); *H04L 47/17* (2013.01); *H04L 47/24* (2013.01)

(58) Field of Classification Search
CPC ....... H04L 45/302; H04L 69/22; H04L 45/74; H04L 47/24; H04L 45/741; H04L 47/17
See application file for complete search history.

(56) References Cited

U.S. PATENT DOCUMENTS

| 9,240,950 B2* | 1/2016 | Vedula | H04L 41/5025 |
| 9,762,485 B2* | 9/2017 | Kaplan | H04L 45/74 |
| 9,906,463 B2* | 2/2018 | Kemmerer | H04L 47/781 |
| 10,225,620 B1* | 3/2019 | Phillips | H04N 21/2385 |
| 2005/0185651 A1 | 8/2005 | Rinne | |
| 2010/0008364 A1 | 1/2010 | Andre et al. | |
| 2010/0110891 A1* | 5/2010 | Shah | H04L 45/00 370/235 |

(Continued)

FOREIGN PATENT DOCUMENTS

| EP | 1521405 A1 | 4/2005 |
| WO | 2008085471 A1 | 7/2008 |

OTHER PUBLICATIONS

L. Han et al, Resource Reservation Protocol for IP Transport QoS, draft-han-tsvwg-ip-transport-qos-00. Jul. 2, 2018, 31 pages.

(Continued)

*Primary Examiner* — Brian T O Connor
(74) *Attorney, Agent, or Firm* — Futurewei Technologies, Inc.

(57) ABSTRACT

The disclosure includes a method for establishing a connection with QoS assurance. In the method, a router receives a first IPv6 packet for establishing a first connection, wherein the first IPv6 packet includes a first QoS requirement for the first connection in a hop-by-hop extension header of the first IPv6 packet. Then, the router modifies the first IPv6 packet by setting first information in the hop-by-hop extension header of the first IPv6 packet, where the first information indicates that the router meets the first QoS requirement. Furthermore, the router sends the modified first IPv6 packet to a second router based on a destination IP address of the modified first IPv6 packet.

20 Claims, 6 Drawing Sheets

(56) References Cited

U.S. PATENT DOCUMENTS

2014/0129710 A1* 5/2014 Bartfai-Walcott ..........................
                                                    H04L 47/2433
                                                         709/224
2017/0289047 A1* 10/2017 Szilagyi .................. H04L 47/20
2017/0373972 A1* 12/2017 Kaplan ................... H04L 45/74
2018/0278493 A1*  9/2018 Guim Bernat ...... H04L 41/5019
2018/0375915 A1* 12/2018 Sridhar ............... H04L 41/5067

OTHER PUBLICATIONS

L. Han et al, IPv6 in-band signaling for the support of transport with QoS, draft-han-6man-in-band-signaling-for-transport-qos-00. Oct. 11, 2017, 40 pages.

S. Deering et al, Internet Protocol, Version 6 (IPv6) Specification, RFC 2460, Dec. 1998, 39 pages.

* cited by examiner

QUALITY OF SERVICE FOR DATA TRANSMISSION

BACKGROUND

Internet Protocol (IP) is the most widely used technology at layer 3 of the Open System Interconnection (OSI) model for the Internet. At layer 4 of the OSI model, Transmission Control Protocol (TCP) and User Datagram Protocol (UDP) are the most widely used protocols for IP network. The design of the Internet protocols is based on the end-to-end principle. The network infrastructure is considered inherently unreliable at any single network element or transmission medium and is dynamic in terms of availability of links and nodes. No central monitoring or performance measurement facility exists that tracks or maintains the state of the network. For the benefit of reducing network complexity, the intelligence in the network is purposely located in the end nodes. As a consequence of this design, the Internet Protocol only provides best-effort delivery and its service is characterized as unreliable without Quality of Service (QoS). Furthermore, TCP and UDP also have no QoS by default. Therefore, the data transmission in an IP network based on TCP or UDP has no QoS.

SUMMARY

According to one aspect of the present disclosure, there is provided a method performed by a first router. According to the method, a first router receives a first IPv6 packet for establishing a first connection, where the first IPv6 packet includes a first QoS requirement for the first connection in a hop-by-hop extension header of the first IPv6 packet; modifies the first IPv6 packet by setting first information in the hop-by-hop extension header of the first IPv6 packet, where the first information indicates that the router meets the first QoS requirement; and sends the modified first IPv6 packet to a second router based on a destination IP address of the modified first IPv6 packet.

Optionally, in any preceding aspect, another implementation of the aspect provides that the first router receives a second IPv6 packet for establishing the first connection from the second router, where the second IPv6 packet carries second information in a destination extension header in the second IPv6 packet, where the second information indicates that a plurality of routers including the first router meet the first QoS requirement; and sends the second IPv6 packet to a next hop based on a destination IP address of the second IPv6 packet.

Optionally, in any preceding aspect, another implementation of the aspect provides that the first router receives an IPv6 data packet of the first connection; modifies the IPv6 data packet by setting third information in a hop-by-hop extension header of the IPv6 data packet, wherein the third information indicates that sending of the modified IPv6 data packet is based on the first QoS requirement; and sends the modified IPv6 data packet a next hop based on a destination IP address of the IPv6 data packet.

Optionally, in any preceding aspect, another implementation of the aspect provides that the first IPv6 packet received by the first router includes a destination extension header carrying third information, where the third information indicates that a plurality of routers meet a second QoS requirement for a second connection.

Optionally, in any preceding aspect, another implementation of the aspect provides that a source node of the first connection is a destination node of the second connection, and wherein a destination node of the first connection is a source node of the second connection.

Optionally, in any preceding aspect, another implementation of the aspect provides that the first IPv6 packet includes a TCP SYN segment and the second IPv6 packet includes a TCP SYN-ACK segment.

Optionally, in any preceding aspect, another implementation of the aspect provides that the first IPv6 packet includes a Transmission Control Protocol (TCP) SYN-ACK segment and the second IPv6 packet includes a TCP ACK segment.

Optionally, in any preceding aspect, another implementation of the aspect provides that the first IPv6 packet includes a first Universal Datagram Protocol (UDP) header and first application layer information indicating that the first IPv6 packet is used to establish the first connection, wherein the second IPv6 packet includes a second UDP header and second application layer information indicating that the second IPv6 packet is used to establish the first connection.

According to one aspect of the present disclosure, there is provided a router. The router comprises a non-transitory memory comprising instructions; and a processor in communications with the memory, where the processor is configured to execute the instructions to: receive a first IPv6 packet for establishing a first connection, wherein the first IPv6 packet includes a first QoS requirement for the first connection in a hop-by-hop extension header of the first IPv6 packet; modify the first IPv6 packet by setting first information in the hop-by-hop extension header of the first IPv6 packet, wherein the first information indicates that the router meets the first QoS requirement; and send the modified first IPv6 packet to a second router based on a destination IP address of the modified first IPv6 packet.

Optionally, in any preceding aspect, another implementation of the aspect provides that the processor is further configured to execute the instructions to: receive a second IPv6 packet for establishing the first connection from the second router, wherein the second IPv6 packet carries second information in a destination extension header in the second IPv6 packet, wherein the second information indicates that a plurality of routers including the first router meet the first QoS requirement; and send the second IPv6 packet to a next hop based on a destination IP address of the second IPv6 packet.

Optionally, in any preceding aspect, another implementation of the aspect provides that the processor is further configured to execute the instructions to: receive an IPv6 data packet of the first connection; modify the IPv6 data packet by setting third information in a hop-by-hop extension header of the IPv6 data packet, wherein the third information indicates that sending of the modified IPv6 data packet is based on the first QoS requirement; and send the modified IPv6 data packet a next hop based on a destination IP address of the IPv6 data packet.

Optionally, in any preceding aspect, another implementation of the aspect provides that the first IPv6 packet received by the first router includes a destination extension header carrying third information, wherein the third information indicates that a plurality of routers meet a second QoS requirement for a second connection.

Optionally, in any preceding aspect, another implementation of the aspect provides that a source node of the first connection is a destination node of the second connection, and a destination node of the first connection is a source node of the second connection.

Optionally, in any preceding aspect, another implementation of the aspect provides that the first IPv6 packet includes a Transmission Control Protocol (TCP) SYN segment and the second IPv6 packet includes a TCP SYN-ACK segment.

Optionally, in any preceding aspect, another implementation of the aspect provides that the first IPv6 packet includes a Transmission Control Protocol (TCP) SYN-ACK segment and the second IPv6 packet includes a TCP ACK segment.

Optionally, in any preceding aspect, another implementation of the aspect provides that the first IPv6 packet includes a first Universal Datagram Protocol (UDP) header and first application layer information indicating that the first IPv6 packet is used to establish the first connection, wherein the second IPv6 packet includes a second UDP header and second application layer information indicating that the second IPv6 packet is used to establish the first connection.

According to one aspect of the present disclosure, there is provided a device. The device comprises a non-transitory memory comprising instructions; and a processor in communications with the memory. The processor is configured to execute the instructions to: send a first IPv6 packet for establishing a first connection to a next hop, wherein the first IPv6 packet includes a first QoS requirement for the first connection in a hop-by-hop extension header of the first IPv6 packet; receive a second IPv6 packet for establishing the first connection, wherein the second IPv6 packet includes a destination extension header indicating that a plurality of routers meet the first QoS requirement; and send IPv6 data packets of the first connection based on the first QoS requirement the next hop.

Optionally, in any preceding aspect, another implementation of the aspect provides that a first IPv6 data packet of the IPv6 data packets carries a hop-by-hop extension header carrying the first QoS requirement.

According to one aspect of the present disclosure, there is provided a device. The device comprises a non-transitory memory comprising instructions; and a processor in communications with the memory. The processor is configured to execute the instructions to: receive a first IPv6 packet for establishing a first connection, wherein the first IPv6 packet includes a hop-by-hop extension header indicating that a plurality of routers meet a first QoS requirement for the first connection; and send a second IPv6 packet for establishing the first connection, wherein the second IPv6 packet includes a destination extension header indicating the plurality of routers meet the first QoS requirement for the first connection.

Optionally, in any preceding aspect, another implementation of the aspect provides that the processor is further configured to execute the instructions to: receive an IPv6 data packet including a hop-by-hop extension header, wherein the hop-by-hop extension header indicates that the plurality of routers meet the first QoS requirement for the first connection; and send an IPv6 packet responsive to the IPv6 data packet based on a source IP address of the IPv6 data packet, wherein the IPv6 packet responsive to the IPv6 data packet includes a destination extension header indicating the plurality of routers meet the first QoS requirement for the first connection.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
FIG. 1 is a schematic diagram of a network according to an embodiment of the disclosure.

FIG. 1 is a schematic diagram of a network according to an embodiment of the disclosure. The network 100 includes devices 110 and 120 and routers 130 and 140 coupling the device 110 with the device 120. The device 110 and the device 120 may send Internet Protocol version 6 (IPv6) packets to each other via the routers 130 and 140. In some embodiments, the network 100 includes more routers between the device 110 and the device 120. However, in the interest of brevity, only two routers are shown in FIG. 1. The devices 110 and 120 may be personal computers, servers, smartphones, laptops, etc.

Figure 2:
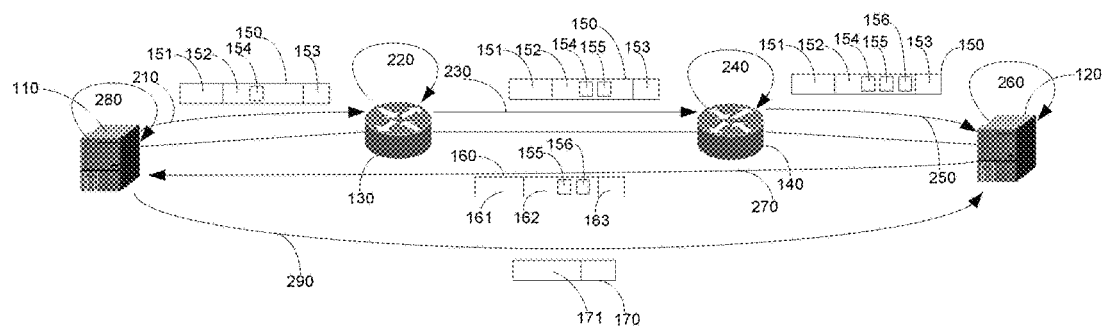
FIG. 2 illustrates a method of establishing a connection with QoS assurance according to an embodiment of the disclosure.

FIG. 2 illustrates a method of establishing a connection based on the network 100 according to an embodiment of the disclosure.

At operation 210, the device 110 sends a first IPv6 packet 150 including a Transfer Control Protocol (TCP) Synchronize (SYN) segment 151 to the router 130. The first IPv6 packet 150 is used to establish a connection from the device 110 to the device 120 and the destination IPv6 address of the first IPv6 packet is the IPv6 address of the device 120. A connection may be determined based on some information in IPv6 packets. In one example, when packets have a same source IP address and a same destination IP address and further have a same source port, and a same destination port and a protocol number, these packets are considered as belonging to a same connection. A connection may be referred to as a path. The first IPv6 packet 150 further includes a hop-by-hop extension header 152. The hop-by-hop extension header 152 may be between an IPv6 header 153 and the TCP SYN segment 151 and carry an upstream QoS requirement 154 for an upstream connection. The upstream connection refers to a connection from the device 110 to the device 120. In some embodiments, when an IPv6 packet carrying a hop-by-hop extension header is received by a plurality of routers between a source node and a destination node, each of the routers will examine the hop-by-hop extension header. For example, the contents of the hop-by-hop extension header will be read by the routers and some actions may be performed according to instructions carried in the hop-by-hop extension header. For example, some information may be added or updated to the hop-by-hop extension header. The source node and the destination node of the IPv6 packet may also examine the hop-by-hop extension header.

An example of a hop-by-hop extension header may be the Hop-by-Hop Options Header defined in RFC 2460. According to RFC 2460, any IPv6 packet including the Hop-by-Hop Options Header needs to be examined by each router receiving the IPv6 packet, such as all routers on the connection, the device 110 and the device 120. Particularly, Hop-by-Hop Options Header is used to carry optional information that must be examined by every node along a packet's delivery path. The Hop-by-Hop Options header is identified by a Next Header value of 0 in the IPv6 header, and has the following format (as shown in Table 1).

TABLE 1

| Next Header | Hdr Ext Len | Options |
| --- | --- | --- |

Next Header is an 8-bit selector which identifies the type of header immediately following the Hop-by-Hop Options header. Next Header uses the same values as the IPv4 Protocol field [RFC-1700 et seq.]. Hdr Ext Len is an 8-bit unsigned integer. It indicates the length of the Hop-by-Hop Options header in 8-octet units, not including the first 8 octets. Options is a variable-length field such that the complete Hop-by-Hop Options header is an integer multiple of 8 octets long. Options contains one or more TLV-encoded options.

Besides the Hop-by-Hop Options Header defined in RFC 2460, some other examples of the hop-by-hop extension header may be further defined.

The upstream QoS requirement 154 includes values of some parameters of the upstream connection. The parameters may include information associated with the QoS of the upstream connection, such as one or more of the bandwidth, burst and latency of data transmission of the connection. In one example, the bandwidth may refer to a scope between a low bandwidth value and a high bandwidth value. The upstream QoS requirement 154 may indicate that the first IPv6 packet is used to establish an upstream connection with QoS assurance. For example, the bandwidth of the upstream connection with QoS assurance is no less than a value included in upstream QoS requirement, such as 5 Mb/s.

At operation 220, the router 130 receives the first IPv6 packet 150 and obtains the upstream QoS requirement 154 in the hop-by-hop extension header 152. The router 130 determines whether its capability of forwarding data packets of the upstream connection meets the upstream QoS requirement 154. If the capability meets the upstream QoS requirement 154, the router 130 programs its hardware according to the upstream QoS requirement so that the router 130 will forward the data packets of the upstream connection based on the upstream QoS requirement 154. The router 130 may further modify the first IPv6 packet 150 by setting the hop-by-hop extension header 152 to indicate that the router 130 meets the upstream QoS requirement. For example, the router 130 may update a first setup state 155 in the hop-by-hop extension header 152 to indicate that the router 130 meets the upstream QoS requirement, where the setup state 155 is in a first setup state field in the hop-by-hop extension header 152. If the router 130 may not meet the upstream QoS requirement, the router 130 may modify the first IPv6 packet 150 by setting the hop-by-hop extension header 152 to indicate that the router 130 does not meet the upstream QoS requirement. For example, the router 130 may update the first setup state 155 in the hop-by-hop extension header 152 to indicate that the router 130 does not meet the upstream QoS requirement.

The first setup state field may also include extra information of the QoS programming state depending on the QoS implementation method. The extra information may include a finite size of data (mapping index) used as the reference to the QoS programming database, by using the reference, the IP forwarding process or hardware can quickly retrieve more details of the QoS programming state such as classification ID, scheduler ID, queue ID, etc. to speed up the IP forwarding with the guaranteed quality.

At operation 230, the router 130 sends the modified first IPv6 packet 150 to the router 140 according to the destination IP address of the first IPv6 packet 150.

At operation 240, the router 140 receives the first IPv6 packet 150 from the router 130 and obtains the upstream QoS requirement 154 in the hop-by-hop extension header 152. Similar to the router 130, the router 140 determines whether its capability of forwarding data packets of the upstream connection meets the upstream QoS requirement 154. If the capability of router 140 meets the upstream QoS requirement 154, the router 140 programs its hardware according to the upstream QoS requirement so that the router 140 will forward the data packets of the upstream connection based on the upstream QoS requirement 154. The router 140 may further may further modify the first IPv6 packet 150 by setting the hop-by-hop extension header of the first IPv6 packet to indicate that the router 140 meets the first QoS requirement. For example, the router 140 may update a second setup state 156 in the hop-by-hop extension header to indicate that the router 140 meets the upstream QoS requirement, where the second setup state 156 is in a second setup state field in the hop-by-hop extension header. If the router 140 may not meet the upstream QoS requirement 154, the router 140 may modify the first IPv6 packet 150 by setting the hop-by-hop extension header 152 to indicate that the router 140 does not meet the upstream QoS requirement. For example, the router 140 may update the setup state in the hop-by-hop extension header 152 to indicate that the router 140 does not meet the upstream QoS requirement 154. In some embodiments, the first setup state field and the second setup state field are two different fields in the hop-by-hop extension header. In some embodiments, the first setup state field and the second setup state field refer to one same field including two or more setup states in the hop-by-hop extension header.

At operation 250, the router 140 sends the first IPv6 packet modified by the router 140 to the device 120 according to the destination IP address of the first IPv6 packet.

At operation 260, the device 120 receives the first IPv6 packet 150 from the router 140 and determines that each router on the upstream connection meets the upstream QoS requirement 154 based on the hop-by-hop extension header 152.

At operation 270, the device 120 sends a second IPv6 packet 160 including a TCP (Synchronize-Acknowledge) SYN-ACK segment 161 to the device 110, where the destination IP address of the second IPv6 packet is the IP address of the device 110. The second IPv6 packet further includes a destination extension header 162 carrying information indicating that each router on the upstream connection meets the upstream QoS requirement 154. In one example, the information may include the first setup state 155 and the second setup state 156. The destination extension header 162 may be between the TCP SYN-ACK segment 161 and an IPv6 header 163. In some embodiments, the destination extension header 162 may be considered as a portion of the IPv6 header 163. In some embodiments, a destination extension header in an IPv6 packet needs to be examined by destination node(s) only. An example of the destination extension header may be the Destination Options Header defined by RFC 2460. The Destination Options header is used to carry optional information that needs be examined only by a packet's destination node(s). The Destination Options header is identified by a Next Header value of 60 in the immediately preceding header, and has the following format (as shown in Table 2).

TABLE 2

| Next Header | Hdr Ext Len | Options |
| --- | --- | --- |

Next Header is an 8-bit selector, which identifies the type of header immediately following the Destination Options header. It uses the same values as the IPv4 Protocol field [RFC-1700 et seq.]. Hdr Ext Len is an 8-bit unsigned integer. It indicates the length of the Destination Options header in 8-octet units, not including the first 8 octets. Options is a variable-length field such that the complete Destination Options header is an integer multiple of 8 octets long. Options contains one or more TLV-encoded options.

At operation 280, the device 110 receives the second IPv6 packet 160 and obtains information indicating that each router on the upstream connection meets the upstream QoS requirement 154 from the destination extension header 162. Based on the information indicating that each router on the upstream connection meets the upstream QoS requirement 154, the device 110 determines that the upstream connection meets the upstream QoS requirement 154.

At operation 290, in order to finish the 3-way handshake defined by TCP, the device 110 further sends a third IPv6 packet 170 including a TCP Acknowledge (ACK) 171 to the device 120. Then the upstream connection with QoS assurance is established.

Figure 3:
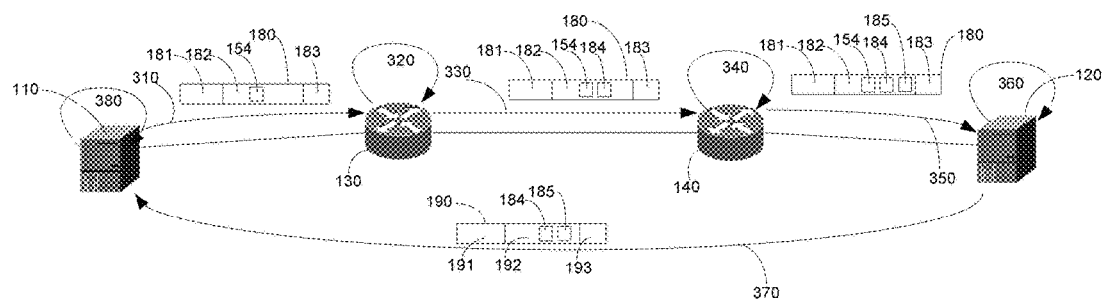
FIG. 3 illustrates a method of checking the state of a connection with QoS assurance during data communication according to an embodiment of the disclosure.

FIG. 3 illustrates a method of checking the state of a connection with QoS assurance during data communication according to an embodiment of the disclosure.

At operation 310, the device 110 may send IPv6 data packets of an upstream connection, e.g. the connection established according to the operations 210-290, to the device 140 after the upstream connection is established. Similar to the first IPv6 packet, some or each of the IPv6 data packets include a hop-by-hop extension header. An IPv6 data packet 180 of the IPv6 data packets sent by the device 110 includes data payload 181, a hop-by-hop extension header 182 carrying the upstream QoS requirement 154 and an IPv6 header 183. The hop-by-hop extension header 182 may be the Hop-by-Hop Options Header defined in RFC 2460. The data payload 181 may be a TCP data segment including video and audio, for example.

At operation 320, the router 130 receives the IPv6 data packet 180 of the IPv6 data packets and determines whether the router 130 meets the upstream QoS requirement 154. When the router 130 meets the upstream QoS requirement 154, a first forwarding state 184 is set, e.g. updated, by the router 130 to indicate that the router 130 meets the upstream QoS requirement 154. When the router 130 does not meet the upstream QoS requirement 154, the first forwarding state 184 is set, e.g. updated, by the router 130 to indicate that the router 130 does not meet the upstream QoS requirement 154.

At operation 330, the router 130 sends the modified IPv6 data packet 180 to the router 140. When the router 130 meets the upstream QoS requirement 154, the router 130 sends the modified IPv6 data packet 180 to the router 140 based on the upstream QoS requirement 154 (with QoS assurance). When the router 130 does not meet the upstream QoS requirement 154, the router 130 sends the modified IPv6 data packet 180 to the router 140 without QoS assurance. In some embodiments, the router 130 may even stop sending the modified IPv6 data packet 180 to the router 140 when the router 130 does not meet the upstream QoS requirement 154.

At operation 340, the router 140 receives the IPv6 data packet 180 of the upstream connection from the router 130, the router 140 determines whether the router 140 meets the upstream QoS requirement 154. Furthermore, the router 140 modifies the IPv6 data packet 180 by setting a second forwarding state 185 in the hop-by-hop extension header 182. An example of the hop-by-hop extension header 182 may be the Hop-by-Hop Option Header defined by RFC 2460. When the router 140 meets the upstream QoS requirement 154, the second forwarding state 185 indicates that the router 140 meets the upstream QoS requirement 154. When the router 140 does not meet the upstream QoS requirement 154, the second forwarding state 185 indicates that the router 140 does not meet the upstream QoS requirement 154

At operation 350, the router 140 sends the IPv6 data packet 180 modified by the router 140 to the device 120. When the router 140 meets the upstream QoS requirement 154, the router 140 sends the modified IPv6 data packet 180 to the device 120 based on the upstream QoS requirement 154 (with QoS assurance). When the router 140 does not meet the upstream QoS requirement 154, the router 140 sends the modified IPv6 data packet 180 to the device 120 without QoS assurance.

At operation 360, the device 120 receives the IPv6 data packet 180 from the router 140 and obtains the first forwarding state 184 and the second forwarding state 185 from the hop-by-hop extension header 182.

At operation 370, the device 120 sends an IPv6 packet 190 including a TCP ACK 191 to the device 110, where the IPv6 packet 190 includes the first forwarding state 184 and the second forwarding state 185 in the Destination extension header 192 between the TCP ACK 193 and an IPv6 header 191. The IPv6 packet 190 may be sent via the router 140 and the router 130 to the device 110 or via other routers. The other routers may include only one of the routers 130 and 140 or include none of the routers 130 and 140.

At operation 380, the device 110 receives the IPv6 packet 190 including the TCP ACK 191 and obtains the first forwarding state 184 and the second forwarding state 185 from the Destination extension header 192. Consequently the device 110 determines whether the upstream connection meets the upstream QoS requirement 154. If the upstream connection meets the upstream QoS requirement 154, the device 110 may continue the upstream connection with QoS assurance. If the upstream connection does not meet the upstream QoS requirement 154, the device 110 may stop the upstream connection or continue the upstream connection without the expectation that the upstream connection meets the upstream QoS requirement 154 (without QoS assurance).

In some embodiments, the IPv6 packet 150 does not have a TCP SYN 151, but has a UDP segment. The UDP segment encapsulates information set by the application layer (layer 7) of the Open Systems Interconnection (OSI) model. The information is used to request for establishing a upstream connection from device 110 to the device 120. After the device 120 receives the IPv6 packet 150, the application layer of the device 120 will obtains the information and consequently send the IPv6 packet 160 to further the establishment of the upstream connection. For the IPv6 packet 160, the TCP SYN-ACK 161 is replaced by a UDP segment including information set by the application layer, where information is used for the establishment of the upstream connection. After the upstream connection is established, the data payload 181 in IPv6 data packet 180 may be a UDP data segment. Furthermore, for the IPv6 packet 190, the TCP ACK 191 is replaced by a UDP segment.

Figure 4:
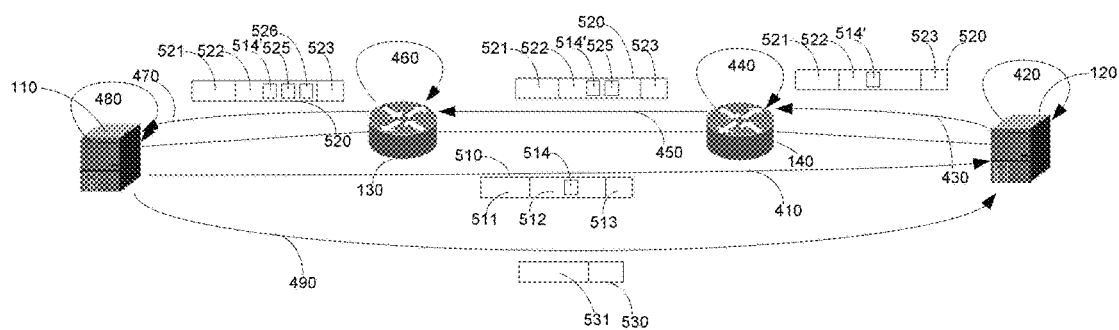
FIG. 4 illustrates a method for establishing a connection with QoS assurance according to an embodiment of the disclosure.

FIG. 4 illustrates a method for establishing a connection with QoS assurance according to an embodiment of the disclosure.

At operation 410, the device 110 sends an IPv6 packet 510 including a TCP SYN 511 to the device 120. The destination IPv6 address of the first IPv6 packet is the IPv6 address of the device 120. The IPv6 packet 510 further includes a destination extension header 512 and an IPv6 header 513. The destination extension header 512 includes a downstream QoS requirement 514 for a connection from the device 120 to the device 110. By the standard definition, the Destination extension header 512 only needs to be examined by the destination node(s) of the IPv6 packet. In this embodiment, the Destination extension header 512 only needs to be examined by the device 120. Therefore, the intermediate nodes, such as the router 130 and the router 140, will not change or delete the QoS requirement 514 included in the Destination extension header. The downstream QoS requirement 514 includes values of some parameters of the downstream QoS path. The parameters may include information associated with the QoS of the downstream path, such as one or more of the bandwidth, burst and latency.

At operation 420, the device 120 receives the IPv6 packet 510, the device 120 obtains the downstream QoS requirement 514 for the downstream connection.

At operation 430, the device 120 sends an IPv6 packet 520 including a TCP SYN-ACK segment 521 to the device 110. The destination IP address of the IPv6 packet 520 is an IPv6 address of the device 110. The IPv6 packet 520 further includes a hop-by-hop extension header 522, such as the Hop-by-Hop Options Header defined by RFC 2460 and an IPv6 header 523. By the standard definition, the hop-by-hop extension header 522 needs to be examined by each router and device which forwards the IPv6 packet. The hop-by-hop extension header 522 includes a downstream QoS requirement 514' for the downstream connection. The downstream QoS requirement 514' is a requirement determined by device 120 based on the downstream QoS requirement 514 and the situation of network resource. For example, it may be the totally same as the downstream QoS requirement 514, or may be the substantially same as or close to downstream QoS requirement 514.

At operation 440, the router 140 receives the IPv6 packet 520 and determines whether router 140 meets the downstream QoS requirement 514'. For example, the router 140 determines whether it may be programmed to a state meeting the downstream QoS requirement 514' in the hop-by-hop extension header 522. When the router 140 may be programmed to the state meeting the downstream QoS requirement 514', the router 140 will program some hardware according to the downstream QoS requirement 514', and store the mapping between a QoS programming state and the downstream connection. The router 140 may modify the IPv6 packet 520 by setting a setup state 525 in the hop-by-hop extension header 522 to indicate that the router 140 has been programmed to meet the downstream QoS requirement 514'. Setting the setup state 525 may refer to updating the setup state 525 already existing in the hop-by-hop extension header 522 or adding the setup state 525 into the hop-by-hop extension header 522. In some embodiments, the setup state 525 may be in a first setup state field in the hop-by-hop extension header 522. When the router 140 may not be programmed to the state meeting the downstream QoS requirement 514' or the programming was failed, the router 140 will set the setup state 525 in the hop-by-hop extension header 522 to indicate that the router 140 has not been programmed to meet the downstream QoS requirement. When the router 140 is programmed to the state meeting the downstream QoS requirement 514', the setup state 525 may also include first forwarding information. The first forwarding information may include a finite size of data (mapping index) used as the reference to the QoS programming database. By using the forwarding information in the IP data forwarding process by router 140, router 140 can quickly retrieve more details of the QoS programming state such as classification ID, scheduler ID, queue ID, etc. to speed up the IP forwarding, e.g. forwarding IPv6 data packets of the connection) with the guaranteed quality.

At operation 450, the router 140 sends the modified IPv6 packet 520 to the router 130.

At operation 460, the router 130 receives the IPv6 packet 520 from the router 130 and determines whether the router 130 may meet (be programmed to a state meeting) the downstream QoS requirement 514' in the hop-by-hop extension header 522. When the router 130 may be programmed to the state meeting the downstream QoS requirement 514', the router 130 will program some hardware according to the parameters of the downstream QoS requirement 514', and store the mapping between a QoS programming state and the downstream connection. The router 130 may further modify the IPv6 packet 520 by setting a setup state 526 in the hop-by-hop extension header 522 to indicate that the router 130 has been programmed to meet the downstream QoS requirement. Setting the setup state 526 in the hop-by-hop extension header 522 may refer to updating the setup state 526 in the hop-by-hop extension header 522 or adding the setup state 526 into the hop-by-hop extension header 522. The setup state 526 may be included in a second setup state field. When the router 130 is programmed to the state meeting the downstream QoS requirement 514', the setup state 526 may also include second forwarding information. The first forwarding information may include a finite size of data (mapping index) used as the reference to the QoS programming database. When the router 130 may not be programmed to the state meeting the downstream QoS requirement 514' or the programming was failed, the router 130 will modify the IPv6 packet 520 by setting the setup state 526 to indicate that the router 130 has not been programmed to meet the downstream QoS requirement 514'. In some embodiments, the first setup state field and the second setup state field refer to one same field including two or more setup states in the hop-by-hop extension header. In some embodiments, the first setup state field and the second setup state field are two different fields in the hop-by-hop extension header 522.

At operation 470, the router 130 sends the IPv6 packet 520 modified by the router 130 to the device 110.

At operation 480, the device 110 receives the IPv6 packet 520 and obtains the setup state 525 and the setup state 526 from the hop-by-hop extension header 522.

At operation 490, after device 110 determines that the setup state 525 and the setup state 526 indicate that router 130 and the router 140 meet the downstream QoS requirement 514', the device 110 may send an IPv6 packet 530 including a TCP ACK 531 to the device 120. After the TCP ACK 531 is received by the device 120, a TCP 3-way handshake is done and the connection from the device 120 to the device 110 (a TCP connection) with QoS assurance is established.

In the situation that the setup state 525 and the setup state 526 indicate that one or more routers 130 and 140 do not meet the downstream QoS requirement 514', the device 110 may have different choices. For example, the device 110 may send an IPv6 packet 530 to the device 120 to establish a downstream connection without QoS assurance. In another example, the device 110 may stop establishing the downstream connection with the device 120 and start to check why some routers do not meet the downstream QoS requirement 514'. In yet another example, the device 110 may adjust the downstream QoS requirement 514' and start a new process for establishing a new downstream connection with QoS assurance based on the adjusted downstream QoS requirement.

Figure 5:
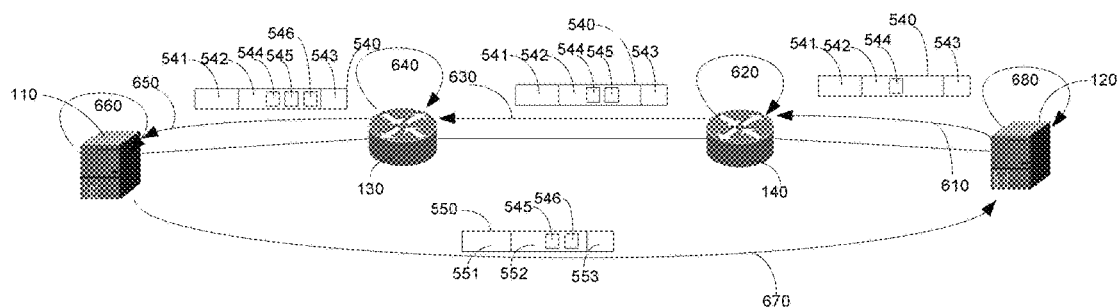
FIG. 5 illustrates a method for checking the state of a connection with QoS assurance during data communication according to an embodiment of the disclosure.

FIG. 5 illustrates a method for checking the state of a connection with QoS assurance during data communication according to an embodiment of the disclosure.

At operation 610, after a downstream connection meeting a downstream QoS requirement (with QoS assurance) is established, e.g. the connection established according to operations 410-490, the device 120 may send IPv6 data packets of the downstream connection to the device, each data packet including a TCP data segment. An IPv6 data packet 540 of the IPv6 data packets sent by the device 120 includes a data payload 541, a hop-by-hop extension header 542 and an IPv6 header 543. The data payload 541 may be a TCP data segment including video and audio.

In some embodiments, the hop-by-hop extension header 542 includes a forwarding state 544 including the first forwarding information in setup state 525 and the second forwarding information in setup state 526.

In some other embodiments, the hop-by-hop extension header 542 does not include the first forwarding information and the second forwarding information. Then a router receiving the IPv6 data packet 540 will determine whether the IPv6 data packet 540 belongs to the downstream connection based on the 5 tuple of the IPv6 data packet 540. The 5 tuple includes a source IP address, a source port number, a destination IP address, a destination port number and transport protocol number or identifier of the IPv6 data packet 540. The source IP address, the destination IP address and the transport protocol number or identifier may be carried in the IPv6 header 543; the source port number and the destination port number may be carried in a TCP header, which is in the data payload 541. After determining that the IPv6 data packet 540 belongs to the downstream connection, the router will forward the IPv6 data packet 540 according to a forwarding state mapping to the downstream connection, where the forwarding according to the forwarding state meets the QoS requirement for the downstream connection or based on the QoS requirement for the downstream connection (downstream QoS requirement).

At operation 620, the router 140 receives the IPv6 data packet 540 and determines whether the router 140 meets a downstream QoS requirement, e.g., downstream QoS requirement 514', of the downstream connection. When the router 140 meets the downstream QoS requirement, the first forwarding state 545 is modified, e.g. updated, by the router 140 to indicate that the router 140 meets the downstream QoS requirement. When the router 140 does not meet the downstream QoS requirement, the first forwarding state 545 is modified, e.g. updated, by the router 140 to indicate that the router 140 does not meet the downstream QoS requirement 514'. In one example, when the hop-by-hop extension header 542 includes the first forwarding information, the router 140 determines whether it a programed forwarding state mapping to the first forwarding information. If it has the programed forwarding state, the router 140 meets the downstream QoS requirement. In another example, when the router 140 has a forwarding state mapping to the downstream connection to which the IPv6 data packet 540 belongs, the router 140 meets the downstream QoS requirement.

At operation 630, the router 140 sends the modified IPv6 data packet 540 to the router. When the router 140 meets the downstream QoS requirement, the router 140 sends the modified IPv6 data packet 540 to the router 130 based on the downstream QoS requirement (with QoS assurance). When the router 140 does not meet the downstream QoS requirement, the router 140 sends the modified IPv6 data packet 540 to the router 130 without QoS assurance. In some embodiments, the router 140 may even stop sending the modified IPv6 data packet 540 to the router 130 when the router 140 does not meet the downstream QoS requirement.

At operation 640, after the router 130 receives the IPv6 data packet 540 of the downstream connection from the router 140, the router 130 determines whether the router 130 meets the downstream QoS requirement 514'. Furthermore, the router 130 modifies the IPv6 data packet 540 by setting a second forwarding state 545 in the hop-by-hop extension header 542. When the router 130 meets the downstream QoS requirement, the second forwarding state 545 indicates that the router 130 meets the downstream QoS requirement. When the router 130 does not meet the downstream QoS requirement, the second forwarding state 546 indicates that the router 130 does not meet the downstream QoS requirement. At operation 650, the router 130 sends the IPv6 data packet 540 modified by the router 130 to the device 110. When the router 130 meets the downstream QoS requirement, the router 130 sends the modified IPv6 data packet 540 to the device 120 based on the downstream QoS requirement (with QoS assurance). When the router 130 does not meet the downstream QoS requirement, the router 130 sends the modified IPv6 data packet 540 to the device 110 without QoS assurance.

At operation 660, the device 110 receives the IPv6 data packet 540 from the router 130 and obtains the first forwarding state 545 and the second forwarding state 546 from the hop-by-hop extension header 542.

At operation 670, the device 110 sends an IPv6 packet 550 including a TCP ACK 551 to the device 120. The IPv6 packet 550 further includes the first forwarding state 545 and the second forwarding state 546 in the destination extension header 552 between the TCP ACK 551 and an IPv6 header 553. The IPv6 packet 550 may be sent via the router 130 and the router 140 to the device 120 or via other routers. The other routers may include only one of the routers 130 and 140 or include none of the routers 130 and 140.

At operation 680, the device 120 receives the IPv6 packet 550 including the TCP ACK 55 1and consequently determines whether the downstream connection meets the downstream QoS requirement based on the first forwarding state 545 and the second forwarding state 546. In one example, when each of routers 130 and 140 meets the downstream QoS requirement, the downstream connection meets the downstream QoS requirement; otherwise, the downstream connection does not meet the downstream QoS requirement. If the downstream connection meets the downstream QoS requirement, the device 120 may continue the downstream connection. If the downstream connection does not meet the downstream QoS requirement, the device 120 may stop the downstream connection or continue the downstream connection without the expectation that the downstream connection meets the downstream QoS requirement 154.

In some embodiments, the TCP SYN 511 in IPv6 packet 510 is replaced by a UDP segment. The UDP segment encapsulates information set by the application layer of the Open Systems Interconnection (OSI) model. The information is used to request for establishing a downstream connection from device 120 to the device 110. After the device 120 receives the IPv6 packet 510, the application layer of the device 120 will obtains the information and consequently send the IPv6 packet 520 to further the establishment of the downstream connection. For the IPv6 packet 520, the TCP SYN-ACK 521 is replaced by a UDP segment including information set by the application layer, where information is used for the establishment of the downstream connection. After the downstream connection is established, the data payload 541 in IPv6 data packet 540 may be a UDP data segment. Furthermore, for the IPv6 packet 550, the TCP ACK 551 is replaced by a UDP segment.

Figures 6, 7A:
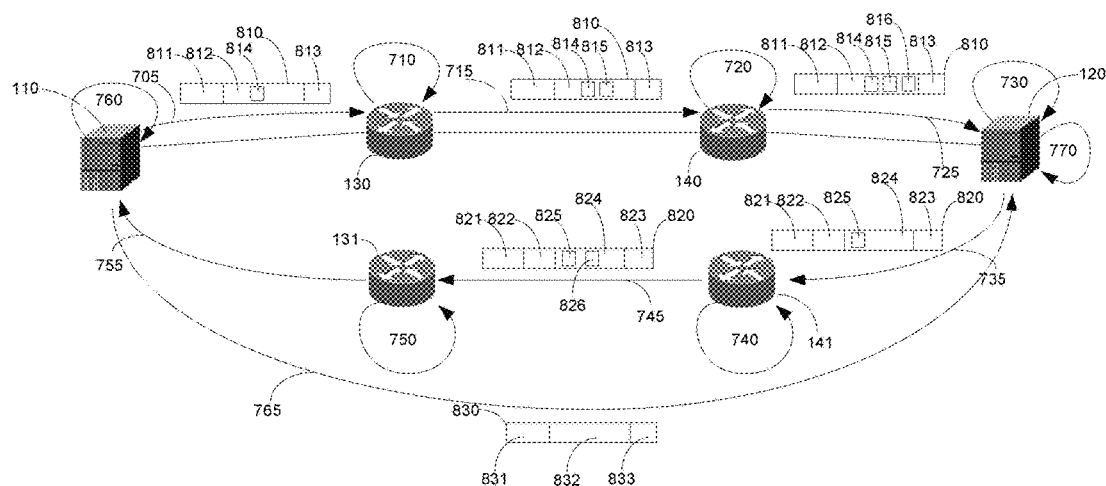
FIG. 6 illustrates a method for establishing a connection with QoS assurance according to an embodiment of the disclosure.
FIG. 7A illustrates a method for checking the state of a connection with QoS assurance during data communication according to an embodiment of the disclosure.

FIG. 6 illustrates a method for establishing a connection with QoS assurance according to an embodiment of the disclosure.

At operation 705, the device 110 sends an IPv6 packet 810 including a TCP SYN segment 811 to the router 130. The IPv6 packet 810 is used to establish a connection from the device 110 to the device 120 and the destination IPv6 address of the IPv6 packet 810 is the IPv6 address of the device 120. The IPv6 packet 810 further includes a hop-by-hop extension header 812. The hop-by-hop extension header 812 may be between an IPv6 header 813 and the TCP SYN segment 811 and carry an upstream QoS requirement 814 for an upstream connection. The upstream connection refers to a connection from the device 110 to the device 120. The hop-by-hop extension header 812 may be the hop-by-hop extension header defined in RFC 2460. According to RFC 2460, any IPv6 packet including the hop-by-hop extension header 812 needs to be examined by each router receiving the IPv6 packet, such as all routers on the connection, the device 110 and the device 120. The upstream QoS requirement 814 includes values of some parameters of the upstream connection. The parameters may include information associated with the QoS of the upstream connection, such as one or more of the bandwidth, burst and latency. The upstream QoS requirement 814 may indicate that the IPv6 packet 810 is used to establish an upstream connection with QoS assurance. For example, the bandwidth of the upstream connection with QoS assurance is no less than a value included in upstream QoS requirement, such as 5 M.

At operation 710, the router 130 receives the IPv6 packet 810 and obtains the upstream QoS requirement 814 in the hop-by-hop extension header 812. The router 130 determines whether its capability of forwarding data packets of the upstream connection meets the upstream QoS requirement 814. If the capability meets the upstream QoS requirement 814, the router 130 programs its hardware according to the upstream QoS requirement so that the router 130 will forward the data packets of the upstream connection based on the upstream QoS requirement 814. The router 130 may further modify the IPv6 packet 810 by setting first information in the hop-by-hop extension header 812 of the IPv6 packet 810, wherein the first information indicates that the router meets the first QoS requirement. For example, the router 130 may update a first setup state 815 in the hop-by-hop extension header 812 to indicate that the router 130 meets the upstream QoS requirement, where the setup state 815 is in a first setup state field in the hop-by-hop extension header 812. If router P1 may not meet the upstream QoS requirement, the router 130 will update the first setup state 815 in the hop-by-hop extension header 812 to indicate that the router 130 does not meet the upstream QoS requirement.

At operation 715, router 130 sends the modified IPv6 packet 810 to the router 140 according to the destination IP address of the IPv6 packet 810.

At operation 720, the router 140 receives the IPv6 packet 810 from the router 130 and obtains the upstream QoS requirement 814 in the hop-by-hop extension header 812. Similar to the router 130, the router 140 determines whether its capability of forwarding data packets of the upstream connection meets the upstream QoS requirement 814. If the capability of router 140 meets the upstream QoS requirement 814, the router 140 programs its hardware according to the upstream QoS requirement so that the router 140 will forward the data packets of the upstream connection based on the upstream QoS requirement 814. The router 140 may further modify the IPv6 packet 810 by setting second information in the hop-by-hop extension header 812 of the IPv6 packet 810, where the second information indicates that the router 140 meets the upstream QoS requirement 814. For example, the router 140 may update a second setup state 816 in the hop-by-hop extension header to indicate that the router 140 meets the upstream QoS requirement 814, where the second setup state 816 is in a second setup state field in the hop-by-hop extension header. If the router 140 may not meet the upstream QoS requirement 814, the router 140 will update the setup state in the hop-by-hop extension header 812 to indicate that the router 140 does not meet the upstream QoS requirement 814. In some embodiments, the first setup state field and the second setup state field are two different fields in the hop-by-hop extension header. In some embodiments, the first setup state field and the second setup state field refer to one same field including two or more setup states in the hop-by-hop extension header 812.

At operation 725, the router 140 sends the IPv6 packet 810 modified by the router 140 to the device 120 according to the destination IP address of the IPv6 packet 810.

At operation 730, the device 120 receives the IPv6 packet 810 from the router 140 and determines that each router on the upstream connection meets the upstream QoS requirement 814 based on the first information and the second information in the hop-by-hop extension header.

At operation 735, the device 120 sends an IPv6 packet 820 including a TCP SYN-ACK segment 821 to the device 110. The destination IP address of the IPv6 packet 820 may be the IP address of the device 110. The IPv6 packet 820 further includes a destination extension header 822 carrying third information indicating that router 130 meets the QoS requirement 814, e.g. the first setup state 155, and the fourth information indicating that router 140 meets the QoS requirement 814, e.g. the second setup state 156. The destination extension header 822 may be between the TCP SYN-ACK segment 161 and an IPv6 header 163. Moreover, the IPv6 packet 820 includes a hop-by-hop extension header 824. The hop-by-hop extension header 824 includes downstream QoS requirement 825 for a downstream connection from the device 120 to the device 110. The IPv6 packet 820 is sent based on its destination IP address.

At operation 740, the router 141 receives the IPv6 packet 820 and obtains the downstream QoS requirement 825 in the hop-by-hop extension header 824. The router 141 determines whether its capability of forwarding data packets of the downstream connection meets the downstream QoS requirement 825. If the capability meets the downstream QoS requirement 825, the router 141 will forward the data packets of the downstream connection based on the downstream QoS requirement 825. The router 141 may further modify the IPv6 packet 820 by setting the hop-by-hop extension header 824 of the IPv6 packet 820 to indicate that the router 141 meets the downstream QoS requirement 825. If router 141 may not meet the downstream QoS requirement 825, the router 141 will set the hop-by-hop extension header 824 to indicate that the router 130 does not meet the upstream QoS requirement. In some embodiments, the setting may refer to setting a setup state 826 in the hop-by-hop extension header 824.

At operation 745, the router 141 sends the IPv6 packet 820 modified by the router 141 to the router 131 based on the destination IP address of the IPv6 packet 820.

At operation 750, the router 131 receives the IPv6 packet 820 and obtains the downstream QoS requirement 825 in the hop-by-hop extension header 824. The router 131 determines whether its capability of forwarding data packets of the downstream connection meets the downstream QoS requirement 825. If the capability meets the downstream QoS requirement 825, the router 131 will forward the data packets of the downstream connection based on the downstream QoS requirement 825. The router 131 may further modify the IPv6 packet 820 by setting the hop-by-hop extension header 824 of the IPv6 packet 820 to indicate that the router 131 meets the downstream QoS requirement 825. If router 131 may not meet the downstream QoS requirement 825, the router 141 will set the hop-by-hop extension header 812 to indicate that the router 130 does not meet the upstream QoS requirement. In some embodiments, the setting may refer to setting a setup state 827 in the hop-by-hop extension header 824.

At operation 755, the router 131 sends the IPv6 packet 820 modified by the router 131 to the device 110.

At operation 760, the device 110 obtain the third information and the fourth information from the destination extension header 822. Based on the obtained information, the router 131 determines that all routers on the upstream connection meet the upstream QoS requirement. Therefore, the upstream connection may be established if the 3-way handshake is finished. Furthermore, based on the hop-by-hop extension header 824, the device 110 may determine whether all the routers on the downstream connection meet the downstream QoS requirement 825.

At operation 765, the device 110 sends an IPv6 packet 830 including a TCP ACK segment 831 to the device 120. The IPv6 packet 830 is sent after the device 110 determines that all the routers on the downstream connection meet the downstream QoS requirement 825. Thus, the IPv6 packet 830 includes a destination extension header 832 between the TCP ACK segment 831 and an IPv6 header 833, where the destination extension header 832 is set to indicate that all the routers on the downstream connection meet the downstream QoS requirement 825. For example, the destination extension header 832 is set to indicate that routers 131 and 141 meet the downstream QoS requirement 825.

At operation 770, the device 120 receives the IPv6 packet 830 from the device 110. The TCP ACK segment 831 indicates that the upstream connection with QoS assurance is established. Furthermore, the destination extension header 832 indicates that the downstream connection with QoS assurance is also established.

FIG. 7A illustrates a method for checking the state of a connection with QoS assurance during data communication according to an embodiment of the disclosure.

After the upstream connection from the device 110 to the device 120 via the routers 130 and 140 and the downstream connection from the device 120 to the device 110 via the routers 140 and 130 are established, the devices 110 and 120 may send data via the connections. During the data transmission, the state of the two connections may be checked.

At operation 905, the router 110 sends an IPv6 data packet 840 of the upstream connection to the router 120. The IPv6 data packet 840 includes a TCP data segment 841, a hop-by-hop extension header 842 and an IPv6 header 843, where the hop-by-hop extension header 842 includes the upstream QoS requirement 814.

At operation 910, the router 130 receives the IPv6 data packet 840 and determines whether the router 130 meets the upstream QoS requirement 814. When the router 130 meets the upstream QoS requirement 814, the hop-by-hop extension header 842 is modified to indicate that router 130 meets the upstream QoS requirement 814. When the router 130 does not meet the upstream QoS requirement 154, the hop-by-hop extension header 842 is modified to indicate that the router 130 does not meet the upstream QoS requirement 814.

At operation 915, the router 130 sends the IPv6 data packet 840 modified by router 130 to the router 140.

At operation 920, the router 140 receives the IPv6 data packet 840 and determines whether the router 140 meets the upstream QoS requirement 814. When the router 140 meets the upstream QoS requirement 814, the hop-by-hop extension header 842 is modified to indicate that 140 meets the upstream QoS requirement 814. When the router 140 does not meet the upstream QoS requirement 814, the hop-by-hop extension header 842 is modified to indicate that the router 140 does not meet the upstream QoS requirement 814.

At operation 925, the router 140 sends the IPv6 data packet 840 modified by router 140 to the device 120.

At operation 930, the device 120 sends an IPv6 data packet 850 to the device 110. The IPv6 data packet 850 includes a TCP data segment 851, a hop-by-hop extension header 852, a destination extension header 853 and an IPv6 header 854. The destination extension header 853 is set to indicate whether all the routers on the upstream connection meet the upstream QoS requirement 814. The hop-by-hop extension header 852 includes the downstream QoS requirement 825.

At operation 935, the router 141 receives the IPv6 data packet 850 and determines whether the router 141 meets the downstream QoS requirement 825. When the router 141 meets the downstream QoS requirement 825, the hop-by-hop extension header 852 is modified to indicate that router 141 meets the downstream QoS requirement 825. When the router 141 does not meet the downstream QoS requirement 825, the hop-by-hop extension header 852 is modified to indicate that the router 141 does not meet the downstream QoS requirement 825.

At operation 940, the router 141 sends the IPv6 data packet 850 modified by the router 141 to the router 131.

At operation 945, the router 131 determines whether the router 131 meets the downstream QoS requirement 825. When the router 131 meets the downstream QoS requirement 825, the hop-by-hop extension header 852 is modified to indicate that router 131 meets the downstream QoS requirement 825. When the router 131 does not meet the downstream QoS requirement 825, the hop-by-hop extension header 852 is modified to indicate that the router 131 does not meet the downstream QoS requirement 825.

At operation 950, the router 131 sends the IPv6 data packet 850 modified by the router 131 to the device 110.

At operation 955, the device 110 determines whether the upstream connection meets the upstream QoS requirement 814 based on destination extension header 853. When all the routers on the upstream connection meet the upstream QoS requirement 814, the upstream connection meets the upstream QoS requirement 814; otherwise, the upstream connection does not meet the upstream QoS requirement 814.

At operation 960, the device 110 sends an IPv6 packet 860 including a TCP ACK 861 to the device 120. The IPv6 packet 860 further includes a destination extension header 862 and an IPv6 header 863, where the destination extension header 862 is set to indicate whether all the routers on the downstream connection meet the downstream QoS requirement 825.

At operation 965, the device 120 receives the IPv6 packet 860 and determines whether the downstream connection meets the downstream QoS requirement 825. When the destination extension header 862 indicates that all the routers on the downstream connection meet the downstream QoS requirement 825, the downstream connection meets the downstream QoS requirement 825; otherwise, the downstream connection does not meet the downstream QoS requirement 825.

In some embodiments, the TCP SYN 511 in IPv6 packet 510 is replaced by a UDP segment. The UDP segment encapsulates information set by the application layer of the Open Systems Interconnection (OSI) model. The information is used to request for establishing a downstream connection from device 120 to the device 110. After the device 120 receives the IPv6 packet 510, the application layer of the device 120 will obtains the information and consequently send the IPv6 packet 520 to further the establishment of the downstream connection. For the IPv6 packet 520, the TCP SYN-ACK 521 is replaced by a UDP segment including information set by the application layer, where information is used for the establishment of the downstream connection. After the downstream connection is established, the data payload 541 in IPv6 data packet 540 may be a UDP data segment. Furthermore, for the IPv6 packet 550, the TCP ACK 551 is replaced by a UDP segment.

Figure 7B:
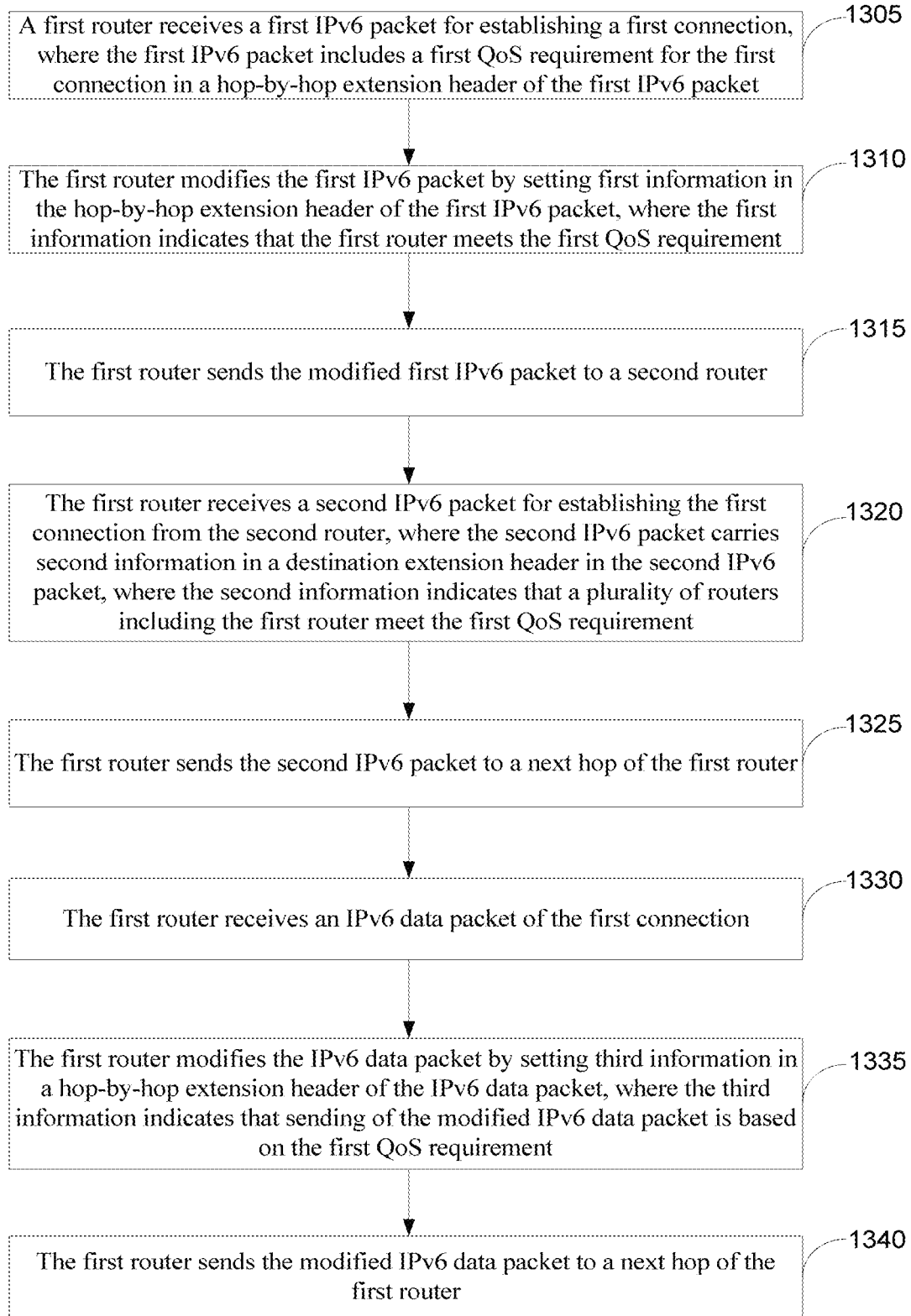
FIG. 7B illustrates a method for a method for establishing a connection with QoS assurance and checking the connection according to an embodiment of the disclosure.

FIG. 7B illustrates a method for establishing a connection with QoS assurance and checking the connection according to an embodiment of the disclosure.

At operation 1305, a first router receives a first IPv6 packet for establishing a first connection, where the first IPv6 packet includes a first QoS requirement for the first connection in a hop-by-hop extension header of the first IPv6 packet.

In one example based on FIG. 2 and FIG. 3, when the first router may be router 130, the first IPv6 packet may be IPv6 packet 150 and the first QoS requirement may be QoS requirement 154. In another example based on FIG. 4 and FIG. 5, when the first router may be the router 140, the first packet may be IPv6 packet 520.

At operation 1310, the first router modifies the first IPv6 packet by setting first information in the hop-by-hop extension header of the first IPv6 packet, where the first information indicates that the first router meets the first QoS requirement. In some embodiments, the hop-by-hop extension header may be the Destination Options Header defined by RFC 2460.

In one example based on FIG. 2 and FIG. 3, when the first IPv6 packet is packet 150, the first information may include setup state 155. In another example based on FIG. 4 and FIG. 5, when the first IPv6 packet is packet 520, the first information may include setup state 525.

At operation 1315, the first router sends the modified first IPv6 packet to a second router. In one example, when the first router is router 130 and the first IPv6 packet is packet 150, the second router may be router 140. In another example, when the first router is router 140 and the first IPv6 packet is packet 520, the second router may be router 130.

At operation 1320, the first router receives a second IPv6 packet for establishing the first connection from the second router, where the second IPv6 packet carries second information in a destination extension header in the second IPv6 packet, where the second information indicates that a plurality of routers including the first router meet the first QoS requirement.

In one example based on FIG. 2 and FIG. 3, when the first router is router 130 and the first IPv6 packet is packet 150, the second IPv6 packet is IPv6 packet 160 and the second information may include setup state 155 and setup state 156. In another example based on FIG. 4 and FIG. 5, when the first router is router 140 and the first IPv6 packet is packet 520, the second IPv6 packet may be IPv6 packet 530.

At operation 1325, the first router sends the second IPv6 packet to a next hop of the first router. In one example, when the first router is the router 130 and the first IPv6 packet is packet 150, the next hop may be device 110. If there is another router between the router 130 and device 110, the next hop may be the other router. In another example, when the first router is the router 140 and the first IPv6 packet is packet 520, the next hop may be device 130.

At operation 1330, the first router receives an IPv6 data packet of the first connection. In one example based on FIG. 2 and FIG. 3, when the first router is the router 130 and the first IPv6 packet is packet 150, device 110 may determine that the first connection between the device 110 and device 120 is with the QoS assurance after the second IPv6 packet is received by the device 110. Therefore, device 110 may send the IPv6 data packet of the first connection to the device 120, where the first connection is from device 110 to device 120. The IPv6 data packet of the first connection may refer to an IPv6 data packet whose destination IP address is the IP address of the device 120. The IPv6 data packet may refer to IPv6 data packet 180 carrying the QoS requirement 154. In another example based on FIG. 4 and FIG. 5, when the first router is the router 140 and the first IPv6 packet is packet 520, device 120 may send the IPv6 data packet the first connection to the device 110, where the first connection is from the device 120 to the device 110.

At operation 1335, the first router modifies the IPv6 data packet by setting third information in a hop-by-hop extension header of the IPv6 data packet, where the third information indicates that sending of the modified IPv6 data packet is based on the first QoS requirement. The modification is performed after the first router determines that the first router meets the first QoS requirement. In one example based on FIG. 2 and FIG. 3, when the first router is the router 130 and the IPv6 data packet is packet 180, the third information may refer to the forwarding state 184. In another example based on FIG. 4 and FIG. 5, when the first router is the router 140 and the IPv6 data packet is packet 540, the third information may refer to forwarding state 545.

At operation 1340, the first router sends the modified IPv6 data packet to a next hop of the first router. In an example based on FIG. 2 and FIG. 3, when the first router is the router 130 and the IPv6 data packet is packet 180, the next hop may be the router 140. In another example based on FIG. 4 and FIG. 5, when the first router is the router 140 and the IPv6 data packet is packet 540, the next hop may be the device 120. Because the IPv6 data packet includes the third information, the device 120 may determine whether the data connection from the device 110 to the device 120 is still with the QoS assurance and further reports a result of the determination to the device 110.

Figure 8:
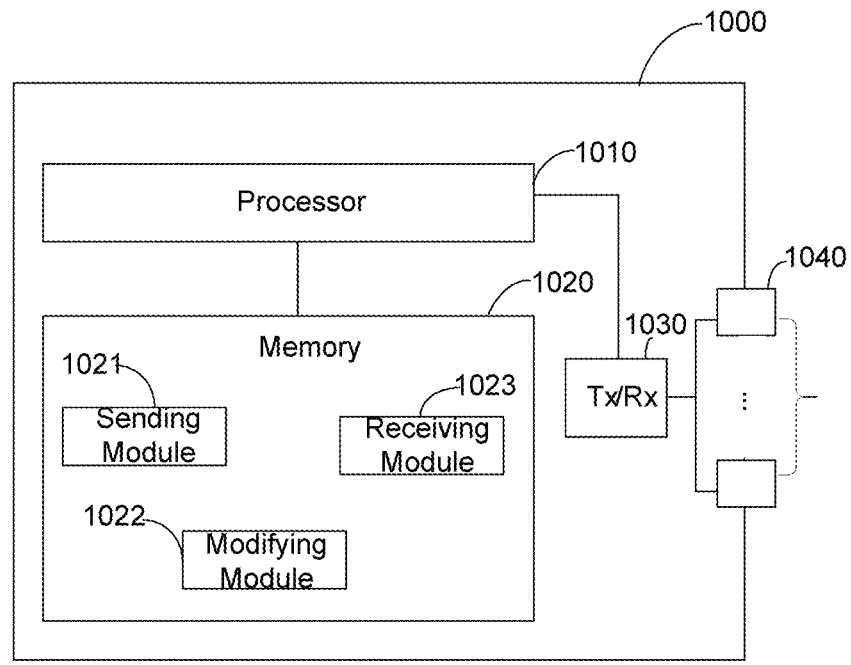
FIG. 8 is a block diagram of a router according to an embodiment of the disclosure.

FIG. 8 is a block diagram of a router according to an embodiment of the disclosure. In some embodiments, the router 1000 may refer to the router 130 or router 140; in some embodiments, the router 1000 may refer to the router 131 or 141. As shown in FIG. 8, the router 1000 may include a processor 1010, a memory 1020 coupled to processor 1010, a transceivers (Tx/Rx) 1030, and ports 1040 coupled to Tx/Rx 1030. The processor 1010 may be implemented as a general processor or may be part of one or more application specific integrated circuits (ASICs) and/or digital signal processors (DSPs). The processor 1010 may refer to a single process or a plurality of processors. Memory 1020 may include a cache for temporarily storing content, e.g., a random-access memory (RAM). Additionally, the memory 1020 may include a long-term storage, e.g., a read-only memory (ROM). In one embodiment, the memory 1020 may include multiple software modules, such as a sending module 1021, a modifying module 1022 and a receiving module 1023. By executing instructions in the software modules, the processor 1010 may perform a plurality of operations. In some embodiments, when a module is configured to perform an operation, it may actually mean that the processor 1010 is configured to execute instructions in the module to perform the operation. By executing the instructions in the memory 1020, the processor 1010 may perform, completely or partially, all operations performed by router 130 or 140. The router 1000 may refer to any device having the capability of routing IP packets based on their destination IP addresses.

The sending module 1021 is configured to receive a first IPv6 packet for establishing a first connection, where the first IPv6 packet includes a first QoS requirement for the first connection in a hop-by-hop extension header of the first IPv6 packet. The modifying module 1022 is configured to modify the first IPv6 packet by setting first information in the hop-by-hop extension header of the first IPv6 packet, where the first information indicates that the router meets the first QoS requirement. The receiving module 1023 is configured to send the modified first IPv6 packet to a second router based on a destination IP address of the modified first IPv6 packet.

The receiving module 1021 may further be configured to receive a second IPv6 packet for establishing the first connection from the second router, where the second IPv6 packet carries second information in a destination extension header in the second IPv6 packet, where the second information indicates that a plurality of routers including the first router meet the first QoS requirement. The sending module 1023 may further be configured to send the second IPv6 packet to a next hop based on a destination IP address of the second IPv6 packet. For example, the sending module 1023 may search a routing table in the router 1000 based on the destination IP address of the second IPv6 packet to determine the next hop and consequently send the second IPv6 packet to the next hop.

Furthermore, the receiving module 1021 not only receive packets for establishing a connection, it may be further configured to receive data packets of the connection. For example, receiving module 1021 is configured to receive an IPv6 data packet of the first connection. Correspondingly, the modifying module 1022 is configured to modify the IPv6 data packet by setting third information in a hop-by-hop extension header of the IPv6 data packet, wherein the third information indicates that sending of the modified IPv6 data packet is based on the first QoS requirement. The sending module 1023 is configured to send the modified IPv6 data packet a next hop based on a destination IP address of the IPv6 data packet. For example, the sending module 1023 may search a routing table in the router 1000 based on the destination IP address of the second IPv6 packet to determine the next hop and consequently send the second IPv6 packet to the next hop.

In some embodiments, the first IPv6 packet for establishing a first connection may refer to the IPv6 packet 150, the second IPv6 packet for establishing the first connection may refer to IPv6 packet 160, and the IPv6 data packet of the first connection may refer to IPv6 data packet 180.

In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 810, the second IPv6 packet for establishing the first connection may refer to IPv6 packet 820, and the IPv6 data packet of the first connection may refer to IPv6 data packet 840.

Figure 9:
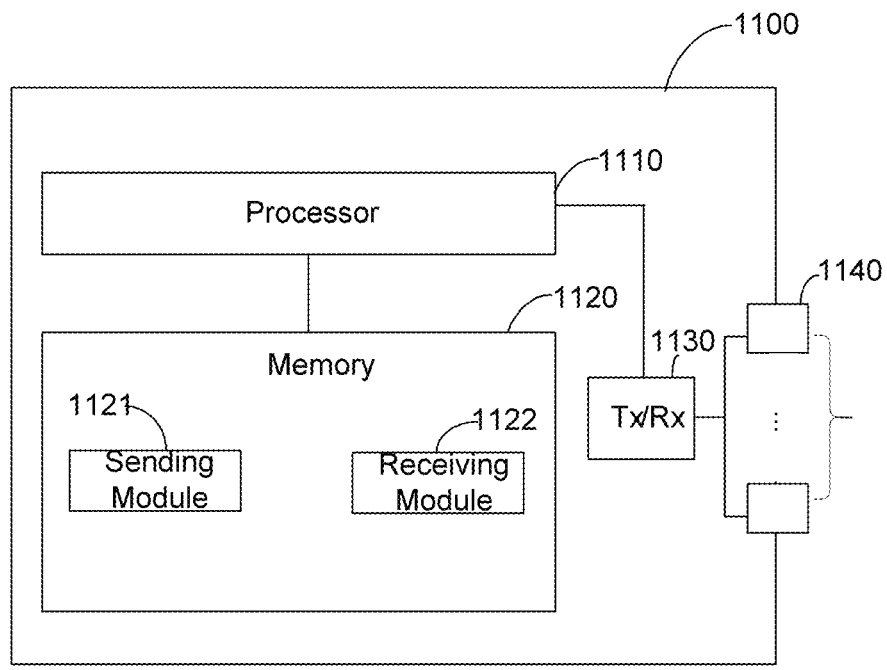
FIG. 9 is a block diagram of a device according to an embodiment of the disclosure.

FIG. 9 is a block diagram of a device according to an embodiment of the disclosure. In some embodiments, the device 1100 may refer to the device 110. As shown in FIG. 9, the device 1100 may include a processor 1110, a memory 1120 coupled to processor 1110, a transceivers (Tx/Rx) 1130, and ports 1140 coupled to Tx/Rx 1130. The processor 1110 may be implemented as a general processor or may be part of one or more application specific integrated circuits (ASICs) and/or digital signal processors (DSPs). The processor 1110 may refer to a single process or a plurality of processors. Memory 1120 may include a cache for temporarily storing content, e.g., a random-access memory (RAM). Additionally, the memory 1120 may include a long-term storage, e.g., a read-only memory (ROM). In one embodiment, the memory 1120 may include multiple software modules, such as a sending module 1121 and a receiving module 1122. By executing instructions in the software modules, the processor 1110 may perform a plurality of operations. In some embodiments, when a module is configured to perform an operation, it may actually mean that the processor 1110 is configured to execute instructions in the module to perform the operation. By executing the instructions in the memory 1120, the processor 1110 may perform, completely or partially, all operations performed by the device 110.

The sending module 1121 is configured to send a first IPv6 packet for establishing a first connection to a next hop, wherein the first IPv6 packet includes a first QoS requirement for the first connection in a hop-by-hop extension header of the first IPv6 packet. The receiving module 1122 is configured to receive a second IPv6 packet for establishing the first connection, wherein the second IPv6 packet includes a destination extension header indicating that a plurality of routers meet the first QoS requirement. Furthermore, sending module 1121 is configured to send IPv6 data packets of the first connection based on the first QoS requirement the next hop.

In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 810, the second IPv6 packet for establishing the first connection may refer to IPv6 packet 820, and the IPv6 data packet of the first connection may refer to IPv6 data packet 840.

Figure 10:
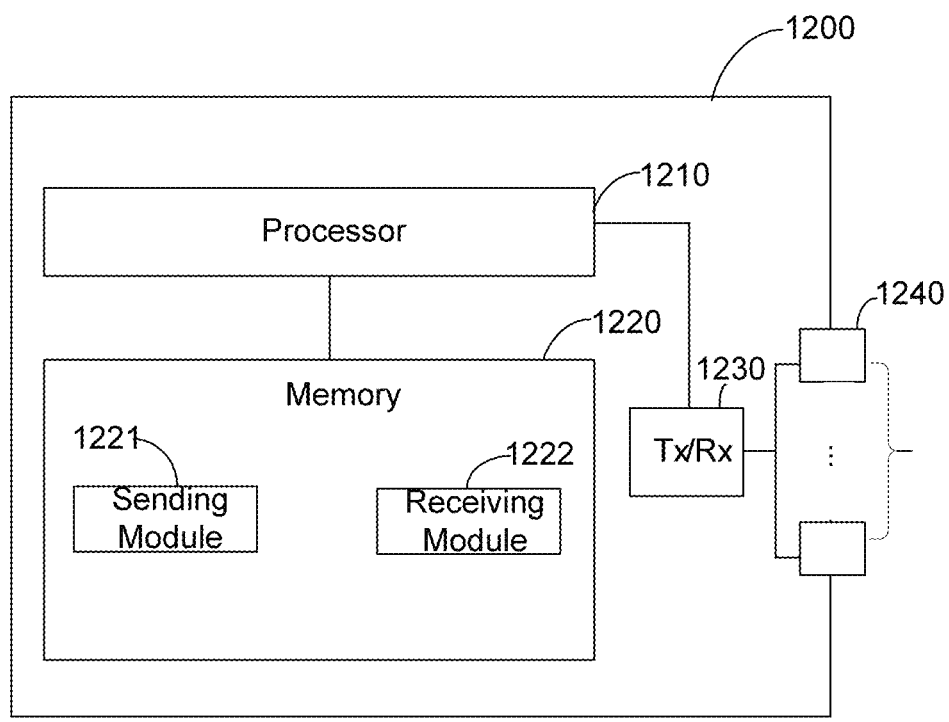
FIG. 10 is a block diagram of a device according to an embodiment of the disclosure.

FIG. 10 is a block diagram of a device according to an embodiment of the disclosure. In some embodiments, the device 1200 may refer to the device 120. As shown in FIG. 10, the device 1200 may include a processor 1210, a memory 1220 coupled to processor 1210, a transceivers (Tx/Rx) 1230, and ports 1240 coupled to Tx/Rx 1230. The processor 1210 may be implemented as a general processor or may be part of one or more application specific integrated circuits (ASICs) and/or digital signal processors (DSPs). The processor 1110 may refer to a single process or a plurality of processors. Memory 1220 may include a cache for temporarily storing content, e.g., a random-access memory (RAM). Additionally, the memory 1220 may include a long-term storage, e.g., a read-only memory (ROM). In one embodiment, the memory 1220 may include multiple software modules, such as a sending module 1221 and a receiving module 1222. By executing instructions in the software modules, the processor 1210 may perform a plurality of operations. In some embodiments, when a module is configured to perform an operation, it may actually mean that the processor 1210 is configured to execute instructions in the module to perform the operation. By executing the instructions in the memory 1220, the processor 1210 may perform, completely or partially, all operations performed by the device 120.

The receiving module 1222 is configured to receive a first IPv6 packet for establishing a first connection, wherein the first IPv6 packet includes a hop-by-hop extension header indicating that a plurality of routers meet a first QoS requirement for the first connection; and the sending module 1221 is configured to send a second IPv6 packet for establishing the first connection, wherein the second IPv6 packet includes a destination extension header indicating the plurality of routers meet the first QoS requirement for the first connection.

Furthermore, the receiving module 1222 is configured to receive an IPv6 data packet including a hop-by-hop extension header, wherein the hop-by-hop extension header indicates that the plurality of routers meet the first QoS requirement for the first connection; and the sending module 1221 is configured to send an IPv6 packet responsive to the IPv6 data packet based on a source IP address of the IPv6 data packet, wherein the IPv6 packet responsive to the IPv6 data packet includes a destination extension header indicating the plurality of routers meet the first QoS requirement for the first connection.

In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 520, the second IPv6 packet for establishing the first connection may refer to IPv6 packet 530, and the IPv6 data packet of the first connection may refer to IPv6 data packet 540. In some embodiments, the first IPv6 packet for establishing a first connection may refer to the IPv6 packet 810, the second IPv6 packet for establishing the first connection may refer to IPv6 packet 820, and the IPv6 data packet of the first connection may refer to IPv6 data packet 840.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a first router, comprising:
receiving a first Internet Protocol version 6 (IPv6) packet for establishing a first connection, the first IPv6 packet indicating a first Quality of Service (QoS) requirement for the first connection in a hop-by-hop extension header of the first IPv6 packet;
modifying the first IPv6 packet in response to a first router capability meeting the first QoS requirement included in the first IPv6 packet by setting first information in the hop-by-hop extension header of the first IPv6 packet, the first information indicating that the first router meets the first QoS requirement; and
sending the modified first IPv6 packet to a second router.

2. The method of claim 1, further comprising:
receiving a second IPv6 packet for establishing the first connection from the second router, wherein the second IPv6 packet carries second information in a destination extension header in the second IPv6 packet, wherein the second information indicates that a plurality of routers including the first router meet the first QoS requirement; and
sending the second IPv6 packet to a next hop of the first router.

3. The method of claim 2, further comprising:
receiving an IPv6 data packet of the first connection;

modifying the IPv6 data packet by setting third information in the hop-by-hop extension header of the IPv6 data packet, the third information indicating that sending of the modified IPv6 data packet is based on the first QoS requirement; and sending the modified IPv6 data packet to a next hop of the first router.

4. The method of claim 1, wherein the first IPv6 packet received by the first router includes a destination extension header carrying third information, wherein the third information indicates that a plurality of routers meet a second QoS requirement for a second connection.

5. The method of claim 4, wherein a source node of the first connection is a destination node of the second connection, and wherein a destination node of the first connection is a source node of the second connection.

6. The method of claim 2, wherein the first IPv6 packet includes a Transmission Control Protocol (TCP) Synchronize (SYN) segment and the second IPv6 packet includes a TCP SYN-Acknowledge (ACK) segment.

7. The method of claim 2, wherein the first IPv6 packet includes a Transmission Control Protocol (TCP) SYN-ACK segment and the second IPv6 packet includes a TCP ACK segment.

8. The method of claim 2, wherein the first IPv6 packet includes a first Universal Datagram Protocol (UDP) header and first application layer information indicating that the first IPv6 packet is used to establish the first connection, wherein the second IPv6 packet includes a second UDP header and second application layer information indicating that the second IPv6 packet is used to establish the first connection.

9. A first router, comprising:
a non-transitory memory comprising instructions; and
a processor in communications with the memory, wherein the processor is configured to execute the instructions to:
receive a first Internet Protocol version 6 (IPv6) packet for establishing a first connection, the first IPv6 packet indicating a first QoS requirement for the first connection in a hop-by-hop extension header of the first IPv6 packet;
modify the first IPv6 packet in response to a first router capability meeting the first QoS requirement included in the first IPv6 packet by setting first information in the hop-by-hop extension header of the first IPv6 packet, the first information indicating that the first router meets the first QoS requirement; and
send the modified first IPv6 packet to a second router.

10. The first router of claim 9, wherein the processor is further configured to execute the instructions to:
receive a second IPv6 packet for establishing the first connection from the second router, wherein the second IPv6 packet carries second information in a destination extension header in the second IPv6 packet, wherein the second information indicates that a plurality of routers including the first router meet the first QoS requirement; and
send the second IPv6 packet to a next hop of the first router.

11. The first router of claim 10, wherein the processor is further configured to execute the instructions to:
receive an IPv6 data packet of the first connection;
modify the IPv6 data packet by setting third information in the hop-by-hop extension header of the IPv6 data packet, the third information indicating that sending of the modified IPv6 data packet is based on the first QoS requirement; and
send the modified IPv6 data packet a next hop of the first router.

12. The first router of claim 9, wherein the first IPv6 packet received by the first router includes a destination extension header carrying third information, wherein the third information indicates that a plurality of routers meet a second QoS requirement for a second connection.

13. The first router of claim 12, wherein a source node of the first connection is a destination node of the second connection, and wherein a destination node of the first connection is a source node of the second connection.

14. The first router of claim 10, wherein the first IPv6 packet includes a Transmission Control Protocol (TCP) SYN segment and the second IPv6 packet includes a TCP SYN-ACK segment.

15. The first router of claim 10, wherein the first IPv6 packet includes a TCP SYN-ACK segment and the second IPv6 packet includes a TCP ACK segment.

16. The first router of claim 10, wherein the first IPv6 packet includes a first Universal Datagram Protocol (UDP) header and first application layer information indicating that the first IPv6 packet is used to establish the first connection, wherein the second IPv6 packet includes a second UDP header and second application layer information indicating that the second IPv6 packet is used to establish the first connection.

17. A non-transitory computer readable medium storing computer instructions for implementing a first router, that when executed by one or more processors, perform the steps of:
receiving a first Internet Protocol version 6 (IPv6) packet for establishing a first connection, the first IPv6 packet including a first Quality of Service (QoS) requirement for the first connection in a hop-by-hop extension header of the first IPv6 packet;
modifying the first IPv6 packet in response to a first router capability meeting the first QoS requirement included in the first IPv6 packet by setting first information in the hop-by-hop extension header of the first IPv6 packet, the first information indicating that the first router meets the first QoS requirement; and
sending the modified first IPv6 packet to a second router.

18. The computer readable medium according to claim 17, further comprising instructions for:
receiving a second IPv6 packet for establishing the first connection from the second router, wherein the second IPv6 packet carries second information in a destination extension header in the second IPv6 packet, wherein the second information indicates that a plurality of routers including the first router meet the first QoS requirement; and
sending the second IPv6 packet to a next hop of the first router.

19. The computer readable medium according to claim 18, further comprising instructions for:
receiving an IPv6 data packet of the first connection;
modifying the IPv6 data packet by setting third information in the hop-by-hop extension header of the IPv6 data packet, the third information indicating that sending of the modified IPv6 data packet is based on the first QoS requirement; and
sending the modified IPv6 data packet to a next hop of the first router.

20. The computer readable medium according to claim 17, wherein the first IPv6 packet includes a destination extension header carrying third information, wherein the third information indicates that a plurality of routers meet a second QoS requirement for a second connection.

\* \* \* \* \*